Oct. 11, 1932.  E. H. LORENZ  1,882,547
METHOD OF AND APPARATUS FOR FORMING GLASSWARE
Filed Oct. 8, 1929  4 Sheets-Sheet 3
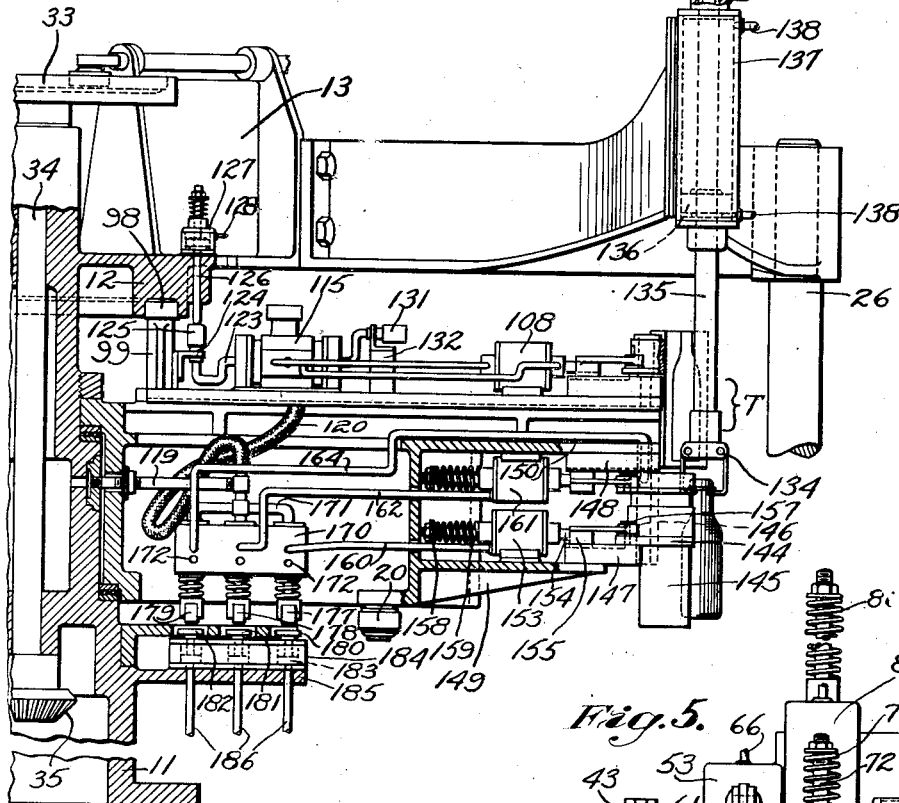
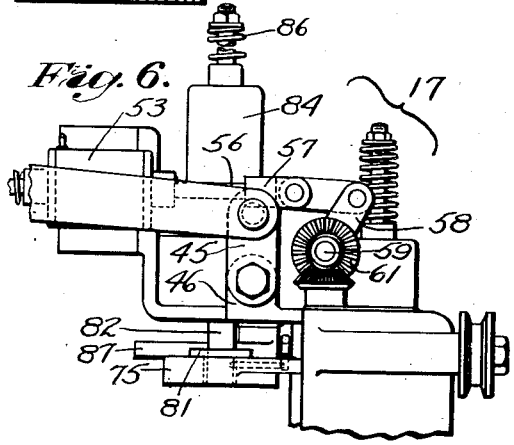
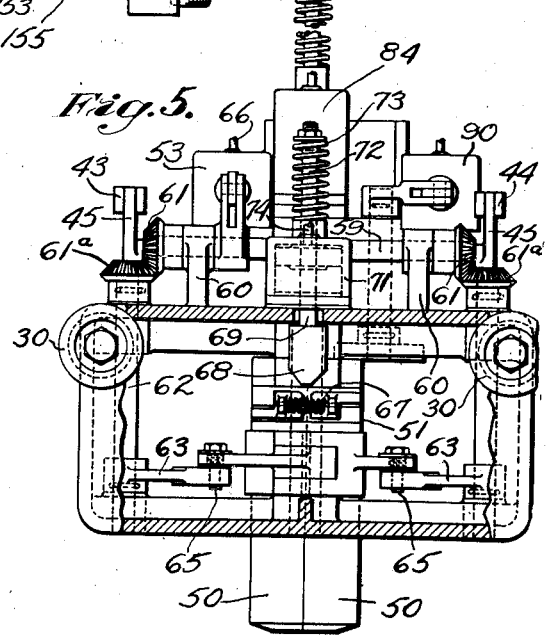
Inventor:
Edward H. Lorenz
By Brown & Parham
Attorneys

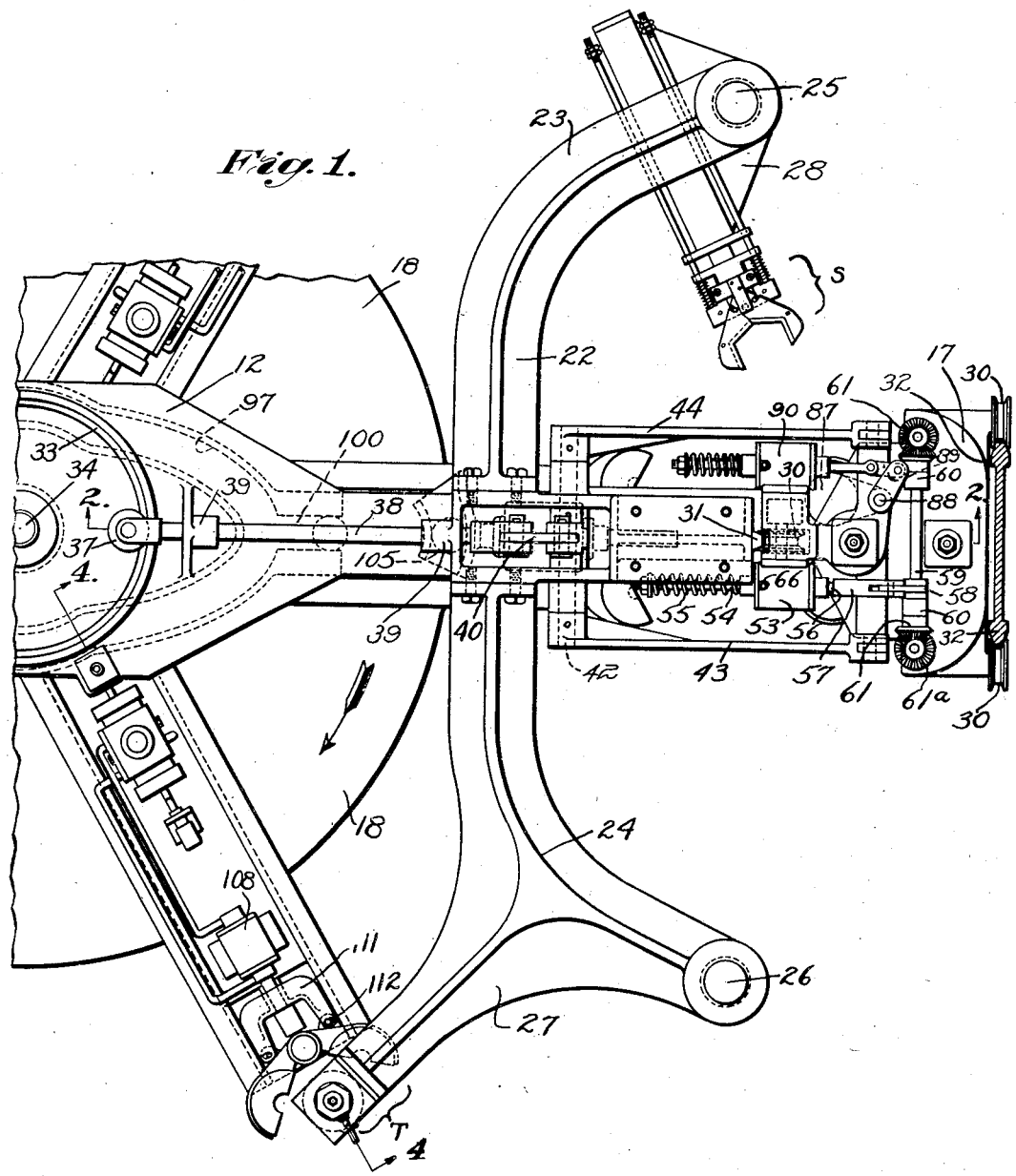

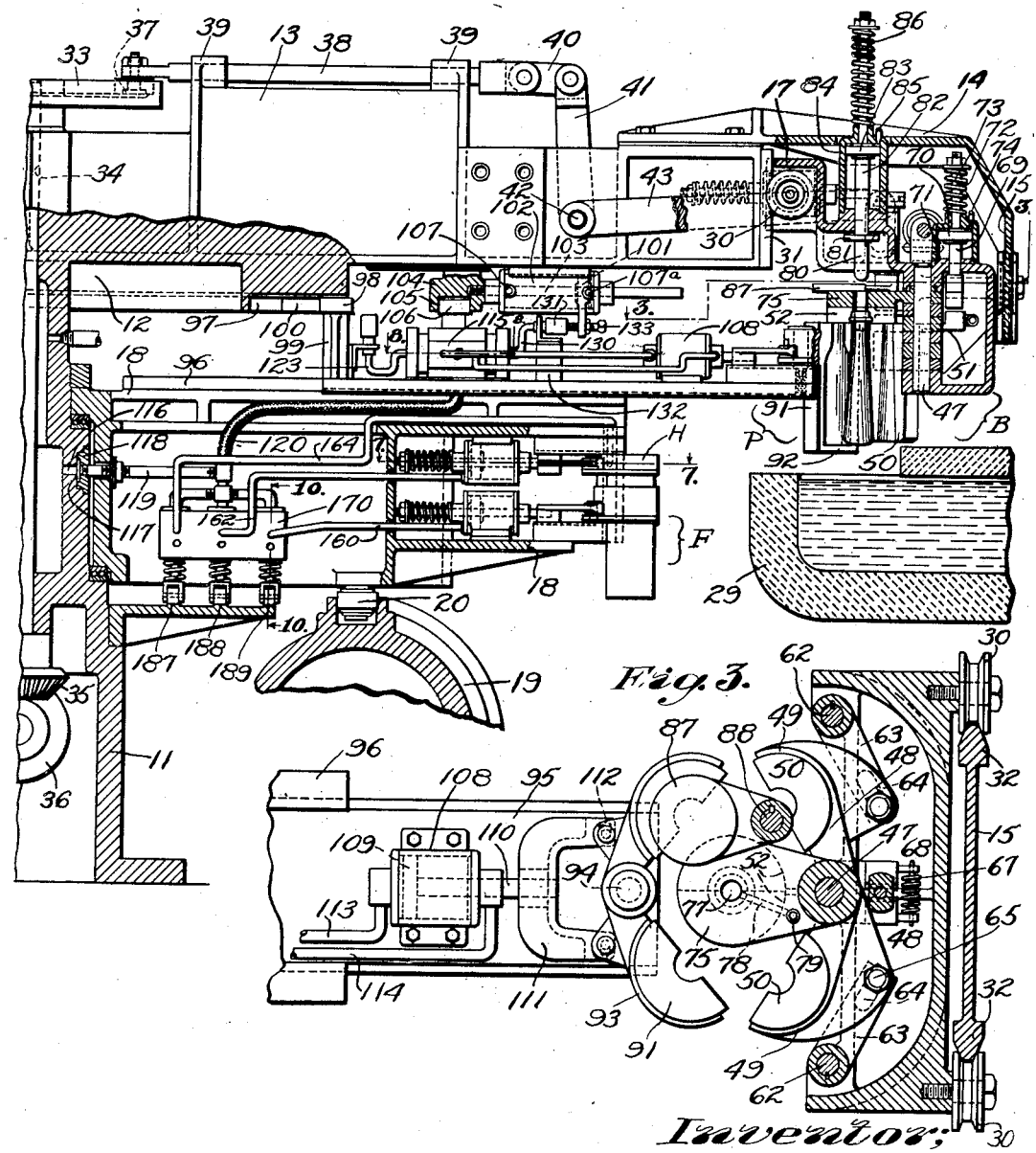

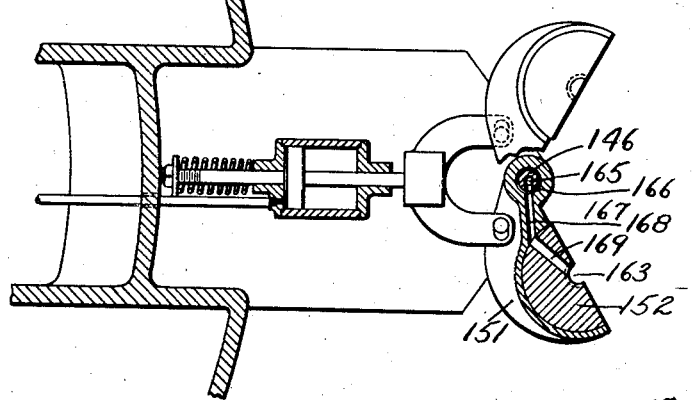
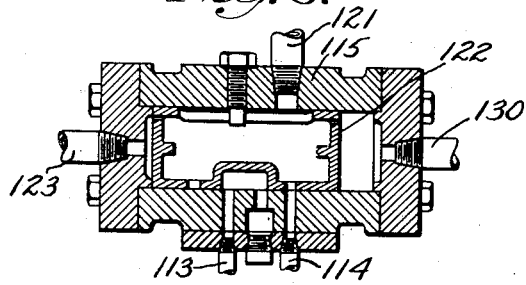
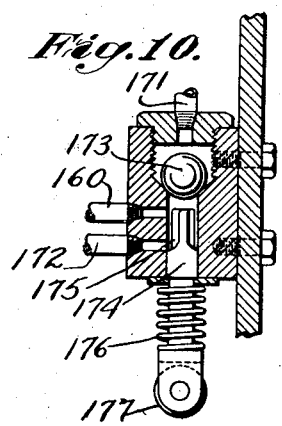
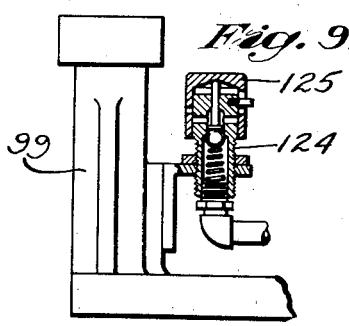

Patented Oct. 11, 1932

1,882,547

UNITED STATES PATENT OFFICE

EDWARD H. LORENZ, OF WEST HARTFORD, CONNECTICUT, ASSIGNOR TO HARTFORD-EMPIRE COMPANY, OF HARTFORD, CONNECTICUT, A CORPORATION OF DELAWARE

METHOD OF AND APPARATUS FOR FORMING GLASSWARE

Application filed October 8, 1929. Serial No. 398,166.

My invention relates to the manufacture of glassware, and particularly relates to methods of, and apparatus for, forming glassware, wherein a charge of glass is gathered by suction and in which a plurality of molds act upon the glass to give it first a preliminary and then a final shape. More particularly, it relates to the formation of hollow glassware, such as bottles, in three distinct stages and by the operation of three molds, i. e., a "blank mold" into which the glass is sucked, and which cooperates with a neck ring and neck pin to form a blank; a "parison mold" in which the blank is blown into a parison; and a "finishing mold" in which the parison is blown to final shape. In those respects, this invention is similar to that disclosed and claimed in my copending application, Ser. No. 440,962, filed April 2, 1930.

Heretofore in the fabrication of glassware by the suction method, the glass to form each article has been sucked into and shaped in one mold to form a parison, and finished in a second mold. This two-mold method suffers from disadvantages inherent in the method, arising from the fact that the sucking operation completely fills the cavity of the parison mold, and hence renders impossible, or wellnigh so, the formation of a parison having an adequately blown cavity, and having other desirable characteristics; the defects in such parisons often result in the production of imperfect glassware.

Glassware made by the suction method usually is superior to that made for example by the gob feed method, because of its better optical appearance. That is due to the fact that in the suction method, the amount of distortion imparted to the glass in the primary stages of formation is a minimum, inasmuch as the parison mold is completely filled and the completion of the parison requires little further manipulation which would distort the glass and aggravate or create non-uniform physical and thermal distribution.

On the other hand, in the gob feed method the parison mold usually is only partially filled and the subsequent settle and counterblowing operations cause a relatively bad optical appearance in the finished ware. But in spite of this, the general distribution in the glass in ware made by the gob-feed method is better than that made by the suction method; there is less difference between the maximum and minimum wall thickness. Hence, the article made by the gob feed method is stronger (its thinner part is thicker) than is the case with the suction made article, and less glass is required for making a given article by the gob-feed method than by the suction method.

The poor general distribution in suction-made glassware often is manifested by eccentricity of the inner and outer walls by unduly thin shoulders, and other defects.

It is important in forming glassware by the so-called "narrow-neck or parison method" that the initial cavity formed by a neck plunger or neck pin be enlarged by blowing during the formation of the parison, in order to assure the proper setting of the finish and shoulders of the ware during the parison stage, to prevent such portions of the ware from being blown out too thin in the final blowing stage. The formation of an adequately large cavity in the parison is also necessary to assure the maximum production of the machine. This is due, in part, to the fact that the enlarging of the cavity causes a corresponding increase in the external area of the parison which facilitates chilling and shortens the final blowing period. Proper blowing of the parison after the neck pin has been withdrawn is necessary also to assure a suitable uniform intimate contact of the glass with the mold walls, and hence a suitable chilling of the surface of the glass forming the body of parison, in order that the body of the parison will be properly formed, and will have sufficient rigidity to be transferred without undue distortion, and in order that it acquire a definitely symmetrical viscosity which will permit uniform distributions of portions of the glass during the final blowing.

Though the desirability of blowing a large initial cavity in the parison has been recognized in the past to some extent, this problem has been heretofore but inadequately solved in the suction gathering machines of the prior art.

In one of the two-mold methods, the glass is gathered by suction into the parison mold and neck ring and about a neck pin or plunger, and blowing pressure is thereafter applied to the glass while it is inclosed by the mold and a shear blade which closes the bottom of the mold. This blowing tends to give the desired intimate contact of the glass with the mold walls, but because of the fact that the molds are completely filled with glass during the sucking operation, the glass can only be compacted, and not distended to increase the external area thereof while the mold is closed. Sometimes in this process, the blowing has been followed by a cracking of the body parison mold. The compressed air which has been admitted thus has an opportunity to distend the parison to some extent while it is suspended from the neck ring. While this process is better than one in which no parison blowing is attempted, it does not adequately and properly prepare the parison for the final blowing stage, and it is obvious that adequate control of the parison formation is lost to a considerable extent in following this practice.

The principal object of the present invention, therefore, is to provide a novel method and novel apparatus for the performance therof, by which glass may be sucked upwardly into a preliminary or blank mold and associated neck ring, and about a neck pin, whereby a blank is first formed and the neck portion or finish of the bottle is given its final shape. Promptly thereafter the blank is transferred, preferably by the neck ring, to a second or "parison mold" which has a cavity intermediate in shape between those of the blank and the finishing molds. In this mold (the parison mold) the blank is blown into a parison. The mold is preferably a complete mold having an integral bottom closure so that all portions of the blank are positively blown out against a mold surface and suitably and uniformly chilled; a suitable large bubble or initial cavity is formed in the parison; and any shear mark which may appear on the blank is obliterated while the glass is still relatively hot.

At this time, the shoulder portions, which are usually weak and improperly formed by the older methods, are given a thickness approaching more closely their desired final thickness, and are more properly set than in the prior method. The parison having been formed in the "parison mold", it is then transferred to a finishing mold and blown to final form, the proper preparation of the parison before its transfer permitting a proper and uniform distribution of the glass in the ware formed in the finishing mold. Such distribution is materially aided by the added chilling resulting from the increased area of the parison, and from the additional chilling action of the parison mold itself. Consequently, the final blowing operation may be performed more quickly and efficiently than has been possible heretofore.

Another object of this invention is to provide a novel method of, and apparatus for, forming glassware wherein a charge of glass may be gathered by suction in a blank mold, and the blank then subjected to blowing pressure in a parison mold, such operations being performed at about the same time that a previously blown parison is being given its final shape in a finishing mold.

A still further object of this invention is to provide novel apparatus for fabricating glassware, characterized in that suction-fed blank forming means are permanently located above a gathering pool from which it successively gathers charges of glass and forms blanks, each blank being transferred to a parison mold in which it is subjected to preliminary blowing pressure, and from which it is transferred to a finishing mold.

Another object of this invention is to provide a novel method of, and apparatus for, fabricating glassware in which glass blanks are successively supplied to a plurality of parison molds from a single blank mold, the parisons being successively transferred from the parison molds to companion finishing molds, which may be movable with the parison blow molds, so that in each cycle of operation, a plurality of parisons are successively shaped in the parison molds while other parisons are being blown to final form in the finishing molds.

Other objects and advantages of this invention will be pointed out in the detailed description thereof which follows, or will become apparent from such description.

In order that the invention may be more fully comprehended, reference should be had to the accompanying drawings, in which novel apparatus for the performance of the method is illustrated.

In said drawings,

Figure 1 is a plan view of apparatus embodying the invention and showing the parts of the apparatus in the positions which they occupy at the time that a suspended blank is being inclosed by a parison mold, and a previously blown parison is being transferred from a parison mold to a finishing mold;

Fig. 2 is a view in vertical longitudinal sectional elevation of the construction shown in Fig. 1, taken substantially on the line 2—2 of Fig. 1;

Fig. 3 is an enlarged view in horizontal section and plan of a fragmentary portion of the construction shown in Fig. 2 taken on the line 3—3 of Fig. 2 and showing a blank mold, a parison mold, and associated mechanisms;

Fig. 4 is a view similar to Fig. 2, but taken on the line 4—4 of Fig. 1 in a vertical plane 60° removed from the plane of Fig. 2, and showing the transfer mechanism for transferring a parison from the parison mold to the companion finishing mold;

Fig. 5 is a view in end elevation of the vertical ram which carries the parison mold, looking from the right of Fig. 1, a part of the structure being broken away to reveal the mechanism for opening and closing the neck mold and parison mold;

Fig. 6 is a view in side elevation of a fragmentary portion of the construction shown in Fig. 5, taken from the left of Fig. 5;

Fig. 7 is a view in horizontal sectional top plan, taken on the line 7—7 of Fig. 2 and showing the blow head structure for one of the finishing molds and associated mechanism;

Fig. 8 is a view in longitudinal section of a pressure actuated distributing valve for controlling the opening and closing of a parison mold;

Fig. 9 is a view partly in side elevation and partly in vertical section, showing a control valve and the support therefor, which valve serves to move the valve shown in Fig. 8 into position to close the parison mold; and Fig. 10 is a view in cross section of the distributing valve shown in Fig. 2, for controlling the supply of blowing air, and the opening and closing of the blow head and finishing mold, said view being taken on the line 10—10 of Fig. 2.

In general, the apparatus of the present invention may include a single blank forming unit B. Said unit is carried by a vertically reciprocating ram and comprises a blank mold, a neck mold and a vacuum and blow head. The unit B operates to form blanks successively, each blank being inclosed by one of the parison molds of the radially movable units P carried by a rotary table, in which mold the blank is blown into a parison while held by the neck mold. Said table also carries the finishing molds F which are located in a horizontal plane below that of the units P, and are so positioned that the companion parison molds are aligned vertically therewith when in their innermost positions, at which time a parison may be transferred from a parison mold to a finishing mold. The parisons are successively transferred in this manner by the operation of transfer mechanism T, and when a parison has been inclosed in a finishing mold, a blow head H engages the finishing mold and the parison is blown to final form.

Referring in detail to the drawings:

The apparatus embodying my invention comprises a column 11, having an annular projection 12 formed near the top thereof, as shown. Extending radially from the projection 12 is a frame 13 of diminishing width, to the outer end of which is bolted a support 14, Fig. 2, having a down-turned end portion 15, the lower portion of which is vertical. Mounted between the outer end of the frame 13 and the down-turned portion 15 of the support 14, is a vertically movable ram 17 which carries the suction blank forming unit designated generally at B.

Mounted to rotate on the column 11 is a mold table 18 upon which are located the parison mold units P, the finishing molds F, and the blow heads H.

The table 18 may be rotated intermittently, or step-by-step, by means of a helical cam 19, which is adapted to engage successively each of a plurality of rollers 20, mounted at intervals on the bottom of the table 18, only one of such rollers being shown. The driving mechanism for the table may be substantially identical with that used on the Hartford-Empire narrow-neck machine, disclosed in my United States Patent No. 1,740,310, granted Dec. 17, 1929, and need not be described in detail here.

In the construction illustrated, six parison mold units and a corresponding number of finishing mold units are employed, only three of the parison mold units and two of the finishing mold units being shown. As will be obvious, any desired number of parison and finishing mold units may be used. The driving mechanism is constructed to rotate the table 60° at each step to move each mold to and from the several operating stations.

Secured to the radially extending frame 13 and extending transversely thereof, is a support 22 having outwardly turned ends 23 and 24. The support 22 is mounted at its ends upon vertical posts 25 and 26 arising from the floor upon which the machine rests. Extending laterally from the curved portion 24 of the support in a branch 27, on the end of which is mounted the transfer mechanism T, Figs. 1 and 4. Mounted on the column 25 is a bracket 28 which serves to support shearing mechanism designated generally at S, for severing the charges of glass in the blank mold from the pool of glass into which the mold is dipped. The shearing mechanism may be a well known type, such as shown for example in U. S. Patent No. 1,823,123 of Karl E. Peiler, granted September 15, 1931. The gathering pool may be contained in a rotary pot indicated at 29, Fig. 2, or in a stationary extension of a glass melting tank, in which latter case suitable means (not shown) may be provided to cause a proper circulation of the glass past the gathering point. The blank forming unit may be shielded from the heat of the gathering pool, as for example by a cover (not shown) for the gathering opening in the pot, or by other heat insulating obstructions. If desirable or necessary, forced air or water cooling of the blank mold also may be provided for, in known manner.

*The ram and blank forming unit (B)*

The ram 17, previously referred to, carries wheels 30, one of which rides on a vertical guide 31 provided on the outer end of the frame 13, Fig. 2, and the others of which engage vertical guides or tracks 32 formed on the extension 15, previously mentioned, see Fig. 3. Thus, the ram 17 and the mechanism supported thereby, are mounted for vertical reciprocation towards and away from the gathering pool.

The ram 17 is raised and lowered at appropriate times by means of an umbrella cam 33, mounted upon the top of a vertical shaft 34, suitably journaled in the column 11 of the machine. The shaft 34 carries a bevel gear 35 on its lower end, which gear meshes with a similar gear 36 rotated at suitable speed by driving mechanism, not shown, (Fig. 2). The cam 33 is engaged by a roller 37 mounted on the end of a rod 38 slidably mounted in guides 39 formed on the frame 13, as shown. At its outer end, the rod 38 is connected by a clevis to a link 40, which in turn is joined to the upwardly extending arm 41 of a bell rank lever.

The bell crank lever includes a transverse shaft 42 journaled in suitable bearings formed on the sides of the frame 13. The arm 41 is secured to the center of the shaft 42 and extends upwardly through an opening in the top of the frame 13, Figs. 1 and 2. Rigidly secured to the outer ends of the shaft 42 are arms 43 and 44. These arms 43 and 44 are pivotally connected to the upper ends of links 45, which in turn are pivotally connected to upstanding lugs 46 provided on the ram 17, (Figs. 1, 2, 5 and 6). Thus, cam 33 will cause reciprocation of shaft 38 and oscillation of the bell crank lever to reciprocate the ram 17 and the mechanism supported thereby, vertically toward and away from the gathering pool.

Mounted in the lower portion of the ram 17 is a vertical pin 47, Figs. 2 and 3. Rotatably mounted on the pin 47 are the arms 48 of holders 49 which carry the sections 50 of the blank mold. The pin 47 also serves as a pivot for the arms 51 of holders for the sections 52 of the neck mold, Figs. 2 and 5.

For opening and closing the blank mold, an air cylinder 53 is mounted on the top of the ram 17, Figs. 1, 5 and 6. The cylinder 53 contains a piston, not shown, having a stem 54 which extends rearwardly through the head of the cylinder, and is encircled by a compression spring 55 interposed between the head of the cylinder and a stop nut on the stem. A rod 56 extending outwardly from the piston, is connected by a link 57 to a crank arm 58 secured to a transverse shaft 59. The shaft 59 is suitably journaled in brackets 60 arising from the top of the ram 17. Rigidly secured to the ends of the shaft 59 are bevel gears 61, each of which meshes with a bevel gear 61a mounted on the upper end of a vertical shaft 62, Figs. 2, 3 and 5. Each of the shafts 62 has a horizontal crank arm 63 mounted thereon and each crank arm has a slot 64 formed in its end, which receives a pin 65 carried by an ear provided on the arm of the blank mold holder 48, Figs. 3 and 5.

The blank mold is yieldingly moved toward, and held in, open position by the action of the compression spring 55. To close the blank mold, fluid pressure is admitted through a conduit 66 which leads from a suitable source, and communicates with the space in the inner end of the cylinder 53. This serves to rock the crank arms 63 as required to close the blank mold. As will be understood, when the fluid pressure is released, the spring 55 again will open the blank mold.

Considering now the operating means for the neck mold, it will be noted by referring to Figs. 2, 3 and 5 that arms 51 of the holders for the sections of the neck mold extend into the interior of the lower portion of the ram, and the ends thereof are connected by a tension spring 67. This tension spring yieldingly holds the neck mold closed. To open the neck mold, a vertically movable wedge 68 is forced downwardly between the rearwardly extending end portions of the arms 51. The wedge 68 is mounted on the bottom end of a rod 69 of a piston 70 mounted in a cylinder 71 provided on the top of the ram 17. Piston 70 has an upwardly extending stem 72, encircled by a compression spring 73, which serves to yieldingly hold the wedge 68 out of engagement with the arms of the neck mold holders. A conduit 74 is connected to the upper end of cylinder 71 through which fluid pressure may be supplied for forcing the wedge 68 downwardly to open the neck mold.

Mounted upon, and extending inwardly from, the pin 47 is a vacuum and blow head structure 75, Figs. 2, 3 and 6. The vacuum and blow head structure is positioned to overlie the neck mold when the neck mold is closed. Said structure has a hole 77 through which a neck pin is projected, as will be described later, and communicating with this hole is a passageway 78 to which is connected a conduit 79, which may be alternately connected at appropriate times with a source of vacuum to draw a charge of glass into the blank and neck molds, and with a source of fluid pressure to blow a blank into a parison in a parison mold. The supply of fluid pressure and vacuum to the conduit 79 may be controlled by suitable valve mechanism, not shown, operating in timed relation to the operations of the blank mold and the parison mold.

For forming initial blowing cavities in the charges of glass which are gathered by the blank mold unit, a neck pin 80 is provided, Fig. 2. A collar 81 is mounted on the neck pin which limits the downward movement thereof. The neck pin 80 constitutes an extension of a rod 82 of a piston 83 located in a cylinder 84, Figs. 2, 5 and 6. The cylinder 84 is mounted on the ram 17 and is provided with a conduit 85 which leads from a suitable source of fluid pressure. The piston 83 and the neck pin carried thereby are yieldingly moved toward, and held in, elevated position by means of a compression spring 86 which encircles a stem extending upwardly from the piston 83. The neck pin 81 is projected downwardly through the opening 77 in the vacuum and blow head structure prior to the filling of the molds, by the admission of fluid pressure through conduit 85. As the neck mold is filled, the pin forms an initial blowing cavity in the blank, but is subsequently retracted to permit the blank to be blown in a parison mold.

In order to prevent communication between the neck mold cavity and the atmosphere through the opening 77 in the vacuum and blow head structure, at the time that a parison is being blown, a pivoted closure 87 is provided, Figs. 1, 2, 3, 5 and 6. This closure is mounted upon the bottom end of a vertical shaft 88, suitably journaled in the ram 17 and offset inwardly and rearwardly of the pivot pin 47, previously referred to. The shaft 88 has a crank arm 89 fastened to the top end thereof. Fluid pressure operated mechanism, designated generally at 90, Figs. 1 and 5, is connected through suitable linkage to crank arm 89 for oscillating closure 87 into and out of closing position. Said mechanism is identical with that employed for opening and closing the blank mold, and therefore need not be described in detail.

*The parison mold unit (P)*

The mold units may be identical in construction and a description of one of them will suffice for all. The sections 91 of the parison mold, which preferably have integral bottom sections 92 (Fig. 2) are mounted in holders 93, pivotally mounted upon an upstanding pin 94 carried by a slide 95, Figs. 1 to 4. The slide 95 is mounted between radially extending guideways 96, formed on the top of the table 18. Radial movements of the slide 95 are effected by means of a stationary, downwardly facing cam 97, formed in part on the under side of the annular portion 12 of the column 11, and in part in the radially projecting portion 13 of the overhanging frame structure, (see Figs. 1 and 2). A cam roller 98 mounted upon a bracket 99, secured to the inner end of slide 95, engages the cam 97, and the shape of the cam is such that as the table 18 is rotated to bring the parison mold unit into radial alignment with the blank mold, the slide and the parison mold are moved outwardly radially of the table. At its outermost portion, the cam 97 opens into a downwardly facing, radial slot 100, which is substantially in radial alignment with the blank mold unit, Figs. 1 and 2. When the table 18 comes to rest, the roller 98 will be free to move outwardly through the slot 100.

Further outward radial movement of the slide 95, in addition to that produced by cam 97, may be effected at this time by means of a piston 101 located in a cylinder 102, secured to the under side of the frame 13, Fig. 2. The rod 103 of piston 101 is connected to a slide 104 mounted in guideways (not shown) formed in the under side of the frame structure 13. Slide 104 has a downwardly facing arcuate groove 105 formed therein, Fig. 1. The open ends of the groove 105 permit a roller 106 mounted on the slide 104 to enter and leave said groove. The roller 106 enters the groove as the parison mold unit is moved into radial alignment with the blank mold. Then, by admitting fluid pressure to the inner end of the cylinder 102 through a conduit 107 leading from a suitable source of fluid pressure, the parison mold unit is moved radially outwardly to bring the parison mold into alignment with a blank suspended from the neck mold. Subsequently, said unit is moved radially inwardly by admitting fluid pressure to the outer end of the cylinder 102 through a conduit 108a, which results in bringing the cam roller 98 back into the cam path 97. When the table 18 is again rotated, roller 106 leaves groove 105, the parison mold unit is moved to its inwardly retracted position, and the parison mold and the parison therein are moved into vertical alignment with the companion finishing mold F.

I next come to consider the mechanism for opening and closing the parison mold. Mounted on the slide 95 is a cylinder 108 in which is located a piston 109, the rod 110 of which is connected to a yoke 111, Figs. 1 to 4. The arms of the yoke have pin and slot connections at 112 to ears formed on the arms of the parison mold holders 93, Fig. 3. Thus, it will be seen that outward movement of the piston 109 will close the parison mold and inward movement thereof will open said mold. Fluid pressure is admitted to, and exhausted from, the inner end of cylinder 108 through a conduit 113, and a similar conduit 114 communicates with the space in the outer end of said cylinder. A distributing valve designated generally at 115 is provided for controlling the flow of fluid pressure through the conduits 113 and 114, Figs. 1, 2, 4 and 8.

Air under pressure is supplied to the interior of the column 11 and a plurality of radial ports 116 are provided in said column, Figs.

2 and 4. These ports constantly communicate with an interior annular groove 117 formed in a ring 118, which rotates with the table 18 in an annular groove on the column 11. A conduit 119 extends through the hub of the table 18 and is connected at its inner end to the ring 118, said conduit communicating with the groove of said ring. At its outer end, the conduit 119 is connected to a flexible hose 120 which leads to a conduit 121 connected to the valve 115, Figs. 2 and 8.

The valve 115 may be described briefly as a two-way, pressure operated, slide valve of known construction, having a sliding valve member 122 therein. When the valve member 122 is in its innermost position, as shown in Fig. 8, the conduit 113 communicates with the atmosphere through an exhaust port, and conduit 114 communicates with conduit 121. As a result, the parison mold will be opened, as shown in Fig. 3, but when the slide valve member 122 is in its outermost position, conduit 114 connects with the exhaust port, and conduit 113 is in communication with conduit 121, as a result of which the parison mold is closed.

For reciprocating the slide valve member 122 in its casing, the fluid pressure is alternately exhausted from the spaces in ends of the valve casing. To exhaust the pressure from the inner end of the casing, a conduit 123 leads therefrom to a spring-pressed exhaust valve 124, mounted on a bracket secured to the bracket 99, previously referred to, Figs. 2, 4 and 9. The valve 124 is opened by depressing a cap 125 of said valve, which engages the stem of the valve member therein. When the parison mold unit is moved to the transfer station by the rotation of the table 18, the valve 124 comes into vertical alignment with a plunger or rod 126, mounted in an extension of the portion 12 of column 11, Fig. 4. This plunger or rod is connected to a piston in a cylinder 127, and is held in its uppermost position by a compression spring, as shown. The plunger is moved downwardly to open valve 124, by admitting fluid pressure from a suitable source into the upper end of the cylinder 127 through a conduit 128 provided for that purpose.

Thus, when the parison mold unit reaches the transfer station, fluid pressure will be exhausted from the inner end of the valve 115, which will result in exhausting fluid pressure from the inner end of the cylinder 108 and admitting fluid pressure to the outer end thereof to open the parison mold. The parison mold may remain open until it is again moved to the parison blowing station.

To move the valve member 122 in the opposite direction, or into the position in which it is shown in Fig. 8, a conduit 130 is connected to the outer end of the valve 115, and leads to a spring pressed valve 131 similar to valve 124, and mounted on a bracket 132 carried by the slide 95, Figs. 1, 2 and 4. When the parison mold unit is moved into radial alignment with the blank mold unit, and then is moved radially outwardly, as previously described, the valve 131 is opened by an adjustable stop screw 133, carried by a bracket secured to the cylinder 102, previously referred to. This permits fluid pressure to be exhausted from the outer end of the valve 115 which results in movement of the valve 122 into position, to close the parison mold about a blank suspended from the neck mold.

The transfer mechanism (T)

The transfer mechanism comprises a pair of tongs designated generally at 134, carried on the bottom end of a hollow rod 135 of a piston 136, Fig. 4. The piston 136 is located in a cylinder 137 secured to the branch 27 of the supporting frame 22, previously referred to. The transfer mechanism is so located that after the table 18 comes to rest, the transfer mechanism will be in vertical alignment with a parison in a parison mold, which, at the time, will be in alignment with the companion finishing mold.

The transfer tongs are raised and lowered by the alternate admission and exhaust of fluid pressure to and from the spaces in the opposite ends of cylinder 137. To this end, conduits 138 are connected to the ends of said cylinder, and suitable valve mechanism, (not shown), may be provided for controlling the flow of fluid pressure therethrough. The tongs 134 may be opened and closed at appropriate times by fluid pressure operated mechanism provided on the rod 135, but not shown, to which fluid pressure is admitted and exhausted through a conduit 139, connected to a tubular extension 140 of the upper end of cylinder 137. Conduit 139 communicates with a longitudinal groove 141 in extension 140, with which groove a radial port 142 formed in the hollow rod 135 constantly communicates. By this means, the fluid pressure is admitted to and exhausted from the tongs operating mechanism (not shown).

The finishing molds (F) and blow heads (H)

The finishing molds F, and blow heads H are, or may be, identical in construction and a description of one of each of them will suffice for all.

The arms of the holders 144 for the sections 145 of the finishing mold are pivotally mounted upon a vertical pin 146, Figs. 2 and 4. This pin extends between, and is mounted in, a pair of vertically spaced plates 147 and 148. The plate 147 is mounted on a bracket 149 formed on the table 18, and the plate 148 is mounted on a web 150 of said table.

The holders 151 for the sections 152 of the divided blow head H also are mounted upon the pin 146, Figs. 2, 4, and 7.

For opening and closing the finishing mold, a cylinder 153 is provided, said cylinder being mounted on the bracket 149. To the rod 154 of a piston located in cylinder 153, a cross-head 155 is connected. The cross-head 155 is provided with a guide received by a slideway formed in the plate 147, in known manner. The ends of the cross-head are connected to pivot pins 157 mounted in ears formed on the mold holders. The piston in cylinder 153 is held in retracted position to hold the finishing mold open, by means of a compression spring 158, which encircles a stem 159, extending rearwardly from the piston through the inner head of the cylinder. To close the finishing mold, fluid pressure is admitted through a conduit 160 which leads to the space in the inner end of the cylinder. Such fluid pressure is exhausted through the conduit 160 to permit the finishing mold to be opened by spring 158. The mechanism for controlling the flow of fluid pressure through conduit 160 will be described hereinafter.

For opening and closing the blow head H, mechanism is provided which is substantially identical with the finishing mold operating means, and is designated generally at 161. Said mechanism is secured to the under side of the web 150 of the table, previously referred to, Figs. 2, 4, and 7. Fluid pressure is admitted to the inner end of the cylinder of the mechanism 161 to close the blow head construction, through a conduit 162, such fluid pressure being permitted to exhaust through said conduit to open the blow head, as will be understood. The means for controlling the flow of fluid pressure through the conduit 162 will be described later.

The sections 152 of the blow head are recessed as indicated at 163 (Fig. 7) to fit over the top of a parison after it has been placed in the finishing mold, and the blow head has been closed. Blowing air is supplied to, and exhausted from, the blow head through means presently to be described, leading to a conduit 164, Figs. 2 and 4. The discharge end of said conduit is connected to the upper end of a vertical passageway 165 formed in the pin 146 previously referred to, Figs. 2, 4, and 7. At its lower end, passageway 165 communicates through a radial port 166 and an annular groove 167 with a horizontal passageway 168 in one of the mold holders, Fig. 7. Passageway 168 leads to another horizontal passageway 169, formed in a section of the blow head, and communicating at its discharge end with the recess 163. Thus, when the blow head is closed, blowing air may be admitted through the above described passageways into the blowing cavity of a parison in the finishing mold.

Considering now the distribution of air pressure through the conduits 160, 162, and 164, a multiple valve structure 170 is provided, Figs. 2, 4, and 10. Air under pressure is supplied to the valve structure 170, through a three-branched header 171 to the center of which the outer end of the supply conduit 119 is connected. The branches of the header 171 lead respectively to separate valve chambers, through which chambers the air is supplied to, and exhausted from, the conduits 160, 162, and 164 respectively, exhaust conduits 172 being connected to suitable ports in the valve structure 171, as shown.

The three valves of the multiple valve structure, which may be referred to as "the finishing mold valve", the "blow head valve", and "the blowing air valve", are identical in construction, and therefore a description of "the finishing mold valve" will suffice for all. Referring to Fig. 10, it will be seen that the appropriate branch of the header 171 leads into an upper valve chamber in which a ball valve 173 is seated. Said valve normally is held in closed position by air pressure and gravity. In the lower valve chamber, a reciprocating piston valve 174 is provided. This valve has a longitudinal port 175 formed therein, and is provided with a downwardly extending stem encircled by a compression spring 176, said stem carrying a cam roller 177 on its lower end. When valve 174 is in its lower position, fluid pressure may flow through conduit 160, into the lower valve chamber, and thence through port 175 and an exhaust port to and through conduit 172 to the atmosphere. When valve 174 is in its upper position, having been raised by means which engages the roller 177, to be described later, valve 173 is held out of engagement with its seat, and fluid pressure may flow from the header 171, through the upper valve chamber into and through conduit 160, exhaust conduit 172 being closed at this time by valve 174.

The cam rollers for the blow head and blowing air valves are designated respectively at 178, and 179, Figs. 2 and 4. It is desired to open the several valves successively, when the finishing mold has come to rest at the transfer station; first, to close the finishing mold about a parison; second, to close the blow head; and third, to admit blowing air to the blow head. To obtain such operation, three pressure operated plungers 180 are located at the transfer station, Fig. 4. These plungers operate through openings 181 formed in a stationary annular shelf 182 mounted on the column 11 of the mold table. The cam rollers come into alignment with said plungers as the finishing mold unit arrives at the transfer station. The plungers are mounted on pistons 183 located in suitable chambers formed in a block or plate 184, said block being secured to a bracket 185, mounted on the column 11. Air conduits 186 are connected to the several piston chambers, for admitting and exhausting fluid pressure to and from said chambers at appropriate times to raise and lower the plungers.

After the several valves have been raised by the plungers 180, the rotation of the finishing mold units away from the transfer station will cause the cam rollers 177, 178, and 179 to ride onto circular cam tracks 187, 188 and 189 respectively (Fig. 2), formed on the shelf 182. Said cam tracks are so shaped that the several valves are held in raised positions during the movement of the finishing mold toward the takeout station, but as said mold arrives at the said station, said rollers 177, 178, and 179 are successively lowered, in the order named. Thus, conduits 160, 162, and 164 are successively cut off from the supply of air pressure, and placed in communication with the atmosphere. This results in the escape of air pressure from the blow head, the opening of the blow head, and the opening of the finishing mold, from which the finished article may now be removed.

Operation

The operation of my novel apparatus is subject to variations, but one preferred mode of operation which may be employed in carrying out my novel method is as follows:

Considering first the operation of the blank forming unit, the blank mold is closed by the admission of air into cylinder 53; the neck mold is closed by the elevation of the wedge 68; the closure 87 is moved into open position by the admisison of air into cylinder 90; and neck pin 80 is projected through the neck mold by the operation of piston 83. At this time, cam 33 causes the ram 17 to be lowered to dip the blank mold into contact with the glass in the gathering pool, suction being created through suction head 75 to fill the body and neck molds with glass. The ram 17 then is elevated by the action of cam 33; the shearing mechanism S operates to sever the string of glass from the charge; and neck pin 80 is retracted by the exhausting of air pressure from cylinder 84. After the neck pin has been retracted, closure 87 is moved into closed position, and the blank mold is opened, preparatory to blowing the parison in a parison mold.

The rotation of the mold table 18 is synchronized with the reciprocation of the ram 17, so that by the time that the blank is ready for blowing, a parison mold unit will have been moved into radial alignment with the blank forming unit, and will have been projected radially of the table by the operation of cam 97 and piston 101, as previously described. This brings the parison mold into a position to inclose the blank, which will have been left suspended from neck mold 52 by the opening of the blank mold, accomplished by the exhausting of fluid pressure from cylinder 53. These operations may be so timed that the movement of the parison mold into alignment with the blank to inclose the blank, and the completion of the up-stroke of the ram, may overlap somewhat.

As the slide or carriage 95 reaches its outermost position, valve 131 is operated by the stop screw 133, as a result of which the parison mold is closed about the suspended blank which is held in the mold in neck-up position. Blowing air now is admitted through the vacuum and blow head 75 to blow the parison and to enlarge the blowing cavity therein. When the blowing is completed, fluid pressure is admitted to cylinder 71 to depress the wedge 68, which opens the neck mold. Piston 101 is now operated to move the slide 95 radially inwardly to its intermediate position, and at this time rotation of the mold table is begun. During the rotation of the table, slide 95 is moved to its innermost position by the action of cam 97 to bring the parison mold and parison into vertical alignment with the companion finishing mold. The ram 17 may descend to gather another charge of glass as the slide 95 is moved to intermediate position, or during the rotation of the mold table, as may be desired. The table may be brought to rest after it has been rotated through an angle of 60°, and after coming to rest, a second parison mold unit is projected toward the blank forming unit, to inclose a second previously formed blank.

The first parison mold unit and companion finishing mold now being at the transfer station, the transfer tongs 134 are closed to grasp the neck of the parison in the parison mold. Thereupon, pressure is admitted to cylinder 127 (Fig. 4) to depress plunger 126, whereby the valve 124 is opened. This results in the opening of the parison mold, and the transfer mechanism is lowered by the operation of piston 186 to move the parison into the previously opened finishing mold, as shown in Fig. 4. The finishing mold operating valve in the multiple valve structure 170 is now operated, as previously described, to admit air pressure to cylinder 153, which results in the closing of the finishing mold. The tongs 134 are then opened, and the transfer mechanism is raised by the operation of piston 136, out of the path of the preliminary blow mold.

The finishing mold being closed, the blow head operating and blowing air valves are successively operated to admit air pressure into conduits 162 and 164, as a result of which the blow head is closed and air pressure admitted thereinto, to begin the blowing of the parison to final shape in the finishing mold. In the meantime, the second parison will have been subjected to blowing pressure in a second parison mold, and the neck mold will have been opened, so that the parison mold unit and second parison will be in readiness for movement to the transfer station. A further step of rotation is now imparted to the mold table, and during such rotation, the second parison mold unit will be retracted to its innermost position and the ram will descend, or will have already descended, to gather a third charge of glass for a third blank. As the first finishing mold unit moves away from the transfer station, the cam rollers 177, 178, and 179 move onto their respective cam tracks, as previously stated, and the blowing of the first parison in the finishing mold will be continued until the finishing mold unit reaches the takeout station. This station may be removed 60° from the parison forming station. By the time that the first finishing mold reaches the takeout station, three additional parisons will have been transferred to finishing molds for final blowing, another parison will have been moved to the transfer station, and another blank will have been moved to the parison blowing station, and will be ready for blowing in the sixth parison mold. The sixth blank may then be subjected to blowing air, as the first finished article is removed, after which the fifth parison is lowered into the appropriate finishing mold, and so on.

As will be obvious, suitable timing mechanism may be provided for controlling the flow of air or fluid pressure to and from the various pressure responsive devices and for supplying vacuum and blowing air. I have not undertaken to illustrate such mechanism because it may readily be provided by one skilled in the art, and forms no part of the present invention.

It is to be understood that various changes in the details of construction of my novel apparatus and in the mode of procedure of my novel method may be made without departing from the invention, as defined in the appended claims.

Having thus described my invention, what I desire to claim and secure by Letters Patent is:

1. A glassware forming machine, comprising a blank mold, means for moving said mold into and out of contact with a pool of glass to gather glass for a blank therein by suction, a parison mold, means including a blank holder associated with said blank mold for positively transferring a blank from the blank mold to the parison mold, a finishing mold, automatic means for transferring a parison from the parison mold to the finishing mold, and automatic means for moving said molds in synchronism with each other.

2. A glassware forming machine, comprising a rotary mold table, a plurality of parison molds mounted thereon, means for supplying glass blanks having finished neck portions to said parison molds, a plurality of finishing molds mounted on said table, means for transferring glass parisons from the parison molds to the finishing molds including means for effecting relative movement between said molds to hold them with their axial center lines in coincidence, and means for applying blowing pressure to the parisons in said finishing molds.

3. A glassware forming machine, comprising a plurality of parison molds, a single suction fed blank mold and a single neck mold associated therewith for successively supplying blanks having finished neck portions to said parison molds, a plurality of finishing molds, and means for transferring parisons from the parison molds to the finishing molds.

4. A glassware forming machine, comprising a suction fed blank mold, a neck mold associated therewith, means for permanently supporting said molds above a gathering pool, means for reciprocating said molds to dip said blank mold into the pool of glass, whereby said molds may be filled with glass by suction, means for opening the blank mold to leave a blank suspended from the neck mold, a plurality of parison molds, means for successively moving each of said parison molds into alignment with a suspended blank, means for causing the blank to be inclosed by the parison mold, means for applying blowing pressure to the blank while confined in the parison mold, means for opening the neck mold, a finishing mold, and means for transferring the parison from the parison mold to the finishing mold.

5. Apparatus for forming glassware, comprising a rotary table, a plurality of parison molds mounted on said table, a plurality of finishing molds carried by said table, blank forming means for supplying blanks to the parison molds, means for permanently supporting the blank forming means above a gathering pool, means for moving said blank forming means into and out of contact with the pool of glass, whereby charges may be gathered therein by suction, means associated with said blank mold for supporting a blank when said mold is opened, means for successively moving each of said parison molds into alignment with a glass blank carried by said supporting means, means for closing the parison mold about said blank, means for applying blowing air to said blank while confined in said parison mold, and means for transferring parisons from the parison molds to the finishing molds.

6. Apparatus for forming glassware, comprising a rotary table, a plurality of parison molds mounted on said table, a plurality of finishing molds carried by said table, blank forming means for supplying blanks to said parison molds, means for moving said parison molds radially of said table to successively align them with the blank forming means, and with the finishing molds on said table, and means for transferring parisons from the parison molds to the finishing molds when the parison molds and finishing molds are in alignment.

7. Glassware forming apparatus, comprising a plurality of parison molds, a plurality of finishing molds, a suction-fed blank forming unit including a neck mold for supplying blanks having finished neck portions to the parison molds, automatic means for transferring blanks from the unit to a parison mold including means for causing relative horizontal movement between the parison mold and said unit to axially align the center lines thereof, means for applying blowing pressure to a blank in a parison mold, automatic means for transferring a parison from a parison mold to a finishing mold including means for closing the finishing mold about the parison, means for applying blowing pressure to a parison in a finishing mold simultaneously with the blowing of a blank in a parison mold, and automatic means for moving the blank forming unit and the parison and finishing molds in synchronism with each other.

8. Apparatus for fabricating glassware comprising a rotary table, a plurality of parison molds mounted on said table at one level, means for supplying blanks to said parison molds, a plurality of finishing molds on said table at a lower level, transfer tongs for transferring parisons from the parison molds downwardly into the finishing molds, and means for operating said tongs to engage a parison in the parison mold, to lower the parison into a position to be enclosed in the finishing mold, and to release the parison to the finishing mold prior to the blowing of the parison in the finishing mold.

9. Apparatus for fabricating glassware comprising a rotary table, a parison mold mounted on said table in one horizontal plane, a finishing mold mounted on said table in a different horizontal plane, transfer tongs for transferring parisons in a vertical direction from the parison mold to the finishing mold, and means for vertically reciprocating said tongs.

10. Apparatus for forming glassware comprising blank forming means, including a blank mold and a companion neck mold, means for periodically charging said blank forming means with glass from the surface of a gathering pool by suction, means for periodically severing the glass connecting the glass in the blank forming means with the glass in the pool, to form a succession of blanks having finished neck portions, parison shaping means, positively acting means for periodically transferring the blanks to the parison shaping means, means for blowing the blanks into parison in the parison shaping means, a plurality of finishing molds, automatic means for transferring the parisons to the finishing molds, means for blowing the parisons to final shape in the finishing molds, and automatic means for moving the blank forming and parison shaping means and the finishing mold in synchronism with each other.

11. Apparatus for forming glassware, comprising blank forming means including a blank mold and a companion neck mold, means for periodically charging said blank forming means with glass from the surface of a gathering pool by suction, means for periodically severing the glass connecting the glass in the blank forming means with the glass in the pool, to form a succession of blanks having finishing neck portions, parison shaping means, positively acting means for periodically transferring the blanks to the parison shaping means including means for closing parison shaping means about the blanks, means for blowing the blanks into parison in the parison shaping means, a plurality of finishing molds, automatic means for transferring the parisons to the finishing molds including means for closing the finishing molds about the parisons, means for blowing at least one parison to final shape in a finishing mold at the time that a blank is being formed in the blank forming means, a carrier for moving the blank forming means in one path, a carrier for moving the finishing molds in a different path, and separate automatic means for actuating said carriers in synchronism.

12. Apparatus for forming glassware, comprising blank forming means including a blank mold and a companion neck mold, means for periodically charging said blank forming means with glass from the surface of a gathering pool by suction, means for periodically severing the glass connecting the glass in the blank forming means with the glass in the pool, to form a succession of blanks having finished neck portions, parison shaping means, positively acting means for periodically transferring the blanks to the parison shaping means, means for blowing the blanks into parisons in the parison shaping means, a plurality of finishing molds, automatic means for transferring the parisons to the finishing molds, means for blowing the parisons to final shape in the finishing molds, and automatic means for operating said blank forming means, the parison shaping and blowing means, and the finish blowing means in synchronism to form a blank and blow the blank into a parison, at the time that at least one parison is being blown to final shape in one of said finishing molds.

13. Apparatus for fabricating glassware, comprising blank forming means including a blank mold for forming a succession of blanks, a carrier for moving the blank forming means toward and away from a charging position, a plurality of parison molds, means for periodically aligning the axial center lines of said blanks and said parison molds for the introduction of the blanks into said parison molds including a carrier for the parison molds separate from the first-named carrier and separate operating means for said carriers, means engaging the blanks at all times for positively introducing them into the parison molds, means for closing the parison molds about the blanks, means for blowing the blanks into parisons in the parison molds, means for opening the parison molds, automatic means operable as the parison molds open for supporting the parisons in axial alignment with the axial center lines of the parison molds, a plurality of finishing molds, means for closing the finishing molds about the parisons while they are supported by the last-named means in such axial alignment with the parison molds, and means for blowing the parisons to final shape in the finishing molds.

14. Apparatus for fabricating glassware, comprising blank forming means including a blank mold for forming a succession of blanks, means including a carrier for moving the blank forming means in a predetermined path toward and away from a charging position, a plurality of parison molds, means including a carrier separate from the first-named carrier for moving said parison molds in a horizontal circular path located laterally of the path of the blank forming means, means for periodically aligning the blanks and the parison molds for the introduction of the blanks into the parison molds and embodying separate actuating means for said carrier, means positively engaging the blanks at all times for positively introducing them into the parison molds, means for closing the parison molds about the blanks, means for blowing the blanks into parisons in the parison molds, means for opening the parison molds, means operable as the parison molds open for supporting the parisons in axial alignment with the axial center lines of the parison molds, a plurality of finishing molds, means for moving the finishing molds in a horizontal circular path, means for closing the finishing molds about the parisons while they are supported in such axial alignment with the parison molds, and means for blowing the parisons to final shape in the finishing molds.

15. Apparatus for forming glassware, comprising a blank forming unit including a blank mold and a neck mold, means including a carrier for moving said blank forming unit from a charging station to a parison blowing station, means for charging said unit with glass at the charging station and for shaping the charge into a blank in said blank mold and neck mold, a parison mold, a carrier for said parison mold separate from the first-named carrier, separate means for intermittently operating said carriers, means for opening the blank mold to leave the blank suspended from the neck mold at the parison blowing station, means for closing the parison mold about the suspended blank at the parison blowing station, means for blowing the blank at the last-named station to form a parison therefrom, a finishing mold, means for rotating said finishing mold in a horizontal circular path, means for transferring the parison to the finishing mold, and means for subsequently blowing the blank to final form in the finishing mold.

16. The method of fabricating glassware which comprises gathering glass in a blank mold and neck mold from the surface of a gathering pool by suction and forming an initial blowing cavity in the blank, enclosing the blank in a parison mold, expanding the blank into contact with the walls of the parison mold by blowing air into the initial blowing cavity, and thus forming a large cavity in the glass, increasing the external area of the glass and the abstraction of heat therefrom by the parison mold, and forming a parison of a size and shape intermediate between those of the blank and the finished glassware and which will give substantially good general distribution in the finished glassware with substantially the minimum consumption of glass, transferring the hollow parison thus formed to a finishing mold, and thereafter blowing the parison to final form in the finishing mold by introducing air into the large cavity of the parison for a substantial period of time and sufficient to both initially form a finished article and to set the glass therein.

17. The method of fabricating glassware which comprises successively forming blanks having finished neck portions and initial blowing cavities therein by gathering charges of glass from the surface of a gathering pool by suction in a predetermined cyclic order, periodically enclosing the blanks in parison molds, periodically expanding the blanks into parisons in the parison molds by blowing air into the initial blowing cavities of the blanks, and thus forming parisons having large cavities therein, increasing the external areas of the parisons and the abstraction of heat therefrom by the parison molds, and forming parisons of sizes and shapes intermediate between those of their respective blanks and finished articles to be produced therefrom, whereby substantially the best general distribution of glass in the finished articles will be obtained with substantially the minimum consumption of glass for each article, periodically transferring the hollow parisons thus formed to finishing molds in predetermined time relation to the blank and parison forming operations, periodically blowing the parisons to final shape in the finishing molds by blowing air into the large cavity of each parison for a substantial period of time and sufficient to both initially form a finished article and set the glass therein, and effecting the last-named blowing operations in predetermined cyclic order and in time relation to the parison forming and transfer operations.

18. Apparatus for forming glassware comprising a blank forming unit including a blank mold and a neck mold, a carrier for said unit, means for intermittently actuating said carrier to move said unit from a charging station to a parison blowing station, a parison mold, a support for the parison mold, means for opening the blank mold to leave a blank suspended from the neck mold at the parison blowing station, means for moving the support horizontally to align the axial center lines of the parison mold and suspended blank, means for closing the parison mold about the blank, means for blowing the blank into a parison in the parison mold, a finishing mold, means for actuating the support to move the parison mold horizontally away from the blank forming unit and into a position to align the axial center line thereof with the axial center line of the finishing mold, stationary transfer tongs, means for effecting engagement of the tongs with the neck of the parison in the parison mold, means for opening the parison mold to leave the parison suspended from the tongs, means for closing the finishing mold about the suspended parison, means for opening the tongs, and means for applying blowing air to the parison in the finishing mold for a substantial period of time and sufficient to initially form a finished article from the parison and to set the glass in said article.

19. A glassware forming machine comprising a suction mold unit, said unit including a neck mold and a body mold permanently supported therebeneath, a blowing mold, means for rotating the blowing mold in a horizontal orbital path about a fixed center, means for permanently supporting said suction mold unit at a fixed distance from said center for movement in a path outside of the path of the parison mold, means for moving the suction mold unit into and out of contact with the surface of a pool of glass, means for opening the body mold, means for horizontally projecting the blowing mold outwardly of its center of rotation into a position where its axial center line is aligned with the axial center line of the neck mold, actuating means separate from the last-named means for closing the blowing mold when in such position, means for retracting the closed blowing mold inwardly of its center of rotation, and means for opening the blowing mold after the inward retraction thereof.

Signed at Hartford, Conn., this 19th day of September, 1929.

EDWARD H. LORENZ.